United States Patent Office 2,988,548
Patented June 13, 1961

2,988,548
11,12-EPOXY-PREGNENOLONE DERIVATIVES AND INTERMEDIATES IN THE PRODUCTION THEREOF
Henry A. Walens, Philadelphia, and Monroe E. Wall, Oreland, Pa., assignors to the United States of America as represented by the Secretary of Agriculture
No Drawing. Filed Nov. 13, 1958, Ser. No. 773,800
10 Claims. (Cl. 260—239.55)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to cyclopentanophenanthrene derivatives, especially the epoxy derivatives, and to methods for the preparation thereof. More particularly the present invention relates to 21-acetoxy-11$\beta$,12$\beta$-epoxy-pregn-4-en-3,20-dione, to the intermediates formed in its preparation from 5$\alpha$,6$\beta$,11$\alpha$,23-tetrabromo-gentrogenin acetate, and the processes by which these compounds are obtained.

The compound, 21-acetoxy-11$\beta$,12$\beta$-epoxy-pregn-4-en-3,20-dione, is an important intermediate in the preparation of physiologically active steroids. On treatment with ethylene glycol in the presence of p-toluenesulfonic acid, it forms the 3,20-dioxolane which on reduction with lithium aluminum hydride, followed by regeneration of the ketone groups, gives corticosterone, a known, physiologically active cortical hormone. Alternatively, 21-acetoxy - 11$\beta$,12$\beta$ - epoxy - pregn - 4 - en - 3,20 - dione is especially important in preparing 12$\alpha$-halogen derivatives. For example treatment of this epoxy compound with hydrogen fluoride gives 21-acetoxy-11$\beta$-hydroxy-12$\alpha$-fluoro-pregn-4-en-3,20-dione, a highly active cortical hormone.

An object of this invention is to provide a process for preparing 21 - acetoxy - 11$\beta$,12$\beta$ - epoxy - pregn - 4 - en - 3,20-dione, useful as a precursor for making physiologically active compounds. Another object is to make 21-acetoxy-11$\beta$,12$\beta$-epoxy-pregn-4-en-3,20-dione from gentrogenin, a steroidal compound obtained from a plant source. Other objects and a fuller understanding of the invention may be obtained by referring to the accompanying description, diagrams and claims.

The compounds of the present invention are derivatives of the sapogenin, gentrogenin, described in U.S. Patent No. 2,830,986. Gentrogenin (12-keto diosgenin), upon acetylation and bromination, gives 5$\alpha$,6$\beta$,11$\alpha$,23-tetrabromo-gentrogenin acetate (I). We have discovered a process for proceeding from 5$\alpha$,6$\beta$,11$\alpha$,23-tetrabromo-gentrogenin acetate to 21-acetoxy-11$\beta$,12$\beta$-epoxy-pregn-4-en-3,20-dione. This process will now be described with reference to accompanying diagrams.

According to the present invention 5$\alpha$,6$\beta$,11$\alpha$,23-tetrabromo-gentrogenin acetate (I), in solution in an organic solvent such as an alcohol or a chlorinated hydrocarbon which is inert to the reagent to be added, is reduced with sodium borohydride to give 12-hydroxy-5$\alpha$,6$\beta$,11$\alpha$,23-tetrabromo-diosgenin acetate (II). An alcoholic solution of the tetrabromide (II) is partially debrominated upon heating with sodium iodide to give 11$\alpha$,23-dibromo-12$\beta$-hydroxy-diosgenin acetate (III). Dehydrobromination of the latter upon standing in an alcoholic solution of a strong alkali such as potassium or sodium hydroxide forms the 11$\beta$-12$\beta$-epoxy function and debromination of this compound by heating in an aqueous alcoholic solution containing copper sulfate and metallic zinc gives 11$\beta$,12$\beta$-epoxy-diosgenin (IV). Reacting 11$\beta$,12$\beta$-epoxy-diosgenin with dilute aqueous hydrochloric acid (the reaction proceeds in an inert organic solution such as in dioxane at room temperature) gives the chlorohydrin, 12$\alpha$-chloro-11$\beta$-hydroxy-diosgenin (V). Heating the chlorohydrin (V) at about 170° C. in acetic anhydride containing about 1% acetic acid forms 12$\alpha$-chloro-3$\beta$,11$\beta$,26-triacetoxy-pseudodiosgenin (VI). The pseudodiosgenin triacetate (VI) is dehydrochlorinated in alcoholic potassium hydroxide to give 11$\beta$,12$\beta$-epoxy-pseudodiosgenin (VII). Acetylation of VII, for example, with acetic anhydride and pyridine, gives 11$\beta$,12$\beta$-epoxy pseudodiosgenin diacetate (VIII). Oxidation of the pseudodiosgenin diacetate (VIII) with chromium trioxide in cold, dilute aqueous acetic acid, followed by treatment of the oxidation product with alkali in tertiary butanol to cleave the side chain at carbon 16 gives 11$\beta$,12$\beta$-epoxy-3$\beta$-hydroxy-pregna-5,16-dien-20-one (IX). Hydrogenation of IX in alcoholic solution, for example, ethanol, with hydrogen in the presence of 2% palladium on carbon forms 11$\beta$,12$\beta$-epoxy-3$\beta$-hydroxy-pregn-5-en-20-one (X), which on Oppenauer oxidation, as with an aluminum alkoxide such as aluminum isopropoxide and cyclohexanone in an inert solvent, for example, toluene, gives 11$\beta$,12$\beta$-epoxy-pregn-4-en-3,20-dione (XI). Iodinating XI with iodine and calcium oxide in tetrahydrofuran and methanol gives 11$\beta$,12$\beta$-epoxy-21-iodo-pregn-4-en-3,20-dione and heating the iodo derivative with potassium acetate in acetone forms 21-acetoxy-11$\beta$,12$\beta$-epoxy-pregn-4-en-3,20-dione (XII).

Compound IV, 11$\beta$,12$\beta$-epoxy-diosgenin and compound VII, 11$\beta$,12$\beta$-epoxy-pseudodiosgenin, differ in that the former represents the sapogenin structure and the latter the corresponding pseudosapogenin. While treatment of IV with reagents to give the pseudosapogenin irreversibly alters the epoxide function, we discovered that proceeding through the chlorohydrin compound (V) the epoxy function could be restored.

The practice of the present invention is illustrated by the following examples.

EXAMPLE 1

*Preparation of 12 - hydroxy - 5$\alpha$,6$\beta$,11$\alpha$,23-tetrabromo-diosgenin acetate (II)*.—Twenty grams of 5$\alpha$,6$\beta$,11$\alpha$,23-tetrabromo-gentrogenin acetate (I) in 600 ml. methanol and 250 ml. methylene chloride was heated at reflux temperature. Ten grams sodium borohydride in 100 ml. methanol was also heated to reflux temperature and combined with the steroid solution portionwise over a time interval of about four minutes. Heating at reflux was continued for 15 minutes. The reaction mixture was then poured into two liters of water and the steroid recovered by ether extractions. The ether solution was washed successively with 3NHCl, NaHCO$_3$, and distilled water and dried over sodium sulfate. The ether was evaporated in vacuo at room temperature to give 20 grams of 12-hydroxy-5$\alpha$6$\beta$,11$\alpha$,23-tetrabromo-diosgenin acetate (II). The infrared spectra showed no ketone left, presence of hydroxyl (band at 3420 cm.$^{-1}$) and acetate (bands at 1735 and 1248 cm.$^{-1}$).

EXAMPLE 2

*Preparation of 12 - hydroxy-11$\alpha$,23-dibromo-diosgenin acetate (III)*.—The product of Example 1 (20 grams compound II) was dissolved in 500 ml. ethanol, 25 grams sodium iodide was added, and the solution was refluxed for 30 minutes. The ethanol solution was poured into 1500 ml. of water. Ethyl ether, 600 ml., was added and the two phase system was washed with just enough sodium thiosulfate solution to decolorize the system. The layers were separated and the water layer was reextracted with fresh ether. The ether portions were combined, washed with distilled water, dried over sodium sulfate, and the dry ether solution evaporated as in Example 1 to give 16 grams of 12-hydroxy - 11α,23 - dibromo-diosgenin acetate (III). The infrared spectra of III was characterized by a typical 23-bromo sapogenin fingerprint and peaks at 3600 cm.$^{-1}$ (hydroxyl) and 1735 and 1248 cm.$^{-1}$ (acetate).

EXAMPLE 3

*Preparation of 11β,12β-epoxy diosgenin (IV).* — The product of Example 2 (16 grams compound III) was dissolved in 600 ml. ethanol and the solution made alkaline with 8 grams potassium hydroxide. This was stirred for 3 hours and then allowed to stand for 20 hours. The alcoholic solution was poured into 1500 ml. of water and the steroid recovered by ether extractions. The ether was washed with water and dried over sodium sulfate. The ether was evaporated, the residue was dissolved in 500 ml. ethanol, and to this solution was added a zinc-copper couple prepared from 60 grams zinc and 450 ml. 15% aqueous copper sulfate solution. The mixture was refluxed with stirring for 3 hours and filtered while hot. The alcoholic solution was diluted with water and the steroid recovered in the usual manner. The dried steroid, 11 grams, was a mixture which on separation by a procedure using Girard's Reagent T gave 8.6 grams of 11β-12β-epoxy diosgenin (IV) and 1.9 grams gentrogenin. The epoxy compound was recrystallized from hexane to give 8 grams 11β-12β-epoxy diosgenin, M.P. 186–189° C., $[\alpha]_D^{25}$—83.7 (dioxane).

EXAMPLE 4

*Preparation of 12α-chloro-11β-hydroxy diosgenin (V).* —8.5 grams of 11β-12β-epoxy diosgenin was dissolved in 450 ml. dioxane, 85 ml. 3 NHCl and 17 ml. water were added, and the solution was stirred for one hour at room temperature. One liter water was added and the steroid was recovered by ether extractions. The ether was washed with sodium bicarbonate and water, dried and evaporated to give 9.5 grams 12α-chloro-11β-hydroxy diosgenin (V). Infrared spectra of this compound had no 875 cm.$^{-1}$ (oxide) peak.

EXAMPLE 5

*Preparation of 12α-chloro-3β,11β,26 - triacetoxy pseudodiosgenin (VI).*—The product of Example 4 (9.5 grams compound V) was acetylated by heating in 25 ml. acetic anhydride containing 0.5% acetic acid in a sealed flask at 179° C. for three hours. The reagent was removed by vacuum evaporation to give 11.3 grams 12α-chloro-3β,11β,26 - triacetoxy pseudodiosgenin (VI). Infrared spectra revealed no F ring bands, and peaks at 1685 cm.$^{-1}$ (pseudosapogenin) and 1735, 1250 cm.$^{-1}$ (triacetate).

EXAMPLE 6

*Preparation of 11β-12β-epoxy pseudodiosgenin (VII).* —The triacetate from Example 5 (11.3 grams compound VI) was dissolved in 100 ml. methanol, 5 grams potassium hydroxide added, and the mixture allowed to stand overnight at room temperature. The product was recovered from ether as in Example 1 to give 8.3 grams of 11β-12β-epoxy pseudodiosgenin (VII).

EXAMPLE 7

*Preparation of 11β - 12β - epoxy pseudodiosgenin diacetate (VIII).*—The product of Example 6 was acetylated by dissolving in 35 ml. of pyridine and 17 ml. acetic anhydride and allowing the solution to stand overnight at room temperature. The product, recovered by ether extraction as in Example 2, was 9.5 grams 11β-12β-epoxy pseudodiosgenin diacetate. Infrared characteristics were peaks at 875 cm.$^{-1}$ (oxide), 1735 and 1250 cm.$^{-1}$ (diacetate), 1685 cm.$^{-1}$ (pseudosapogenin), and lack of F-ring bands.

EXAMPLE 8

*Preparation of 11β,12β-epoxy-3β-hydroxy-pregna-5,16-dien-20-one (IX).*—Eight grams of compound VIII (from Example 7) were dissolved in 100 ml. acetic acid and cooled to 16° C. Four grams chromium trioxide in 50 ml. 50% aqueous acetic acid were cooled to 10° C. and added dropwise, with stirring, to the steroid solution over a time interval of about five minutes. The temperature of the mixture was maintained at 15° C. or less during the addition. Stirring was continued for one hour at room temperature. The steroid was recovered by ether extractions as described previously. The side chain degradation was completed by dissolving the residue in 150 ml. tertiary butyl alcohol, adding 5 grams potassium hydroxide in 3 ml. water and shaking the mixture for three hours. The steroid was recovered and crystallized from methanol to give 0.7 gram of 11β,12β-epoxy-3β-hydroxy - pregna-5,16-dien-20-one, M.P. 242–250° C., $[\alpha]_D^{25}$+29.0° (dioxane). The methanol mother liquors were evaporated to dryness and gave 2.3 grams of residue which was acetylated with acetic anhydride-pyridine. This product was purified by chromatography to give 1.4 grams of 3β-acetoxy-11β,12β-epoxy-pregna-5,16-dien-20-one, M.P. 165–166.5° C.

EXAMPLE 9

*Preparation of 11β,12β-epoxy-3β-hydroxy-pregn-5-en-20-one (X).*—Compound IX from Example 8, 0.27 gram in 16 ml. of ethanol was hydrogenated for 17 minutes at room temperature and atmospheric pressure with 25 mg. of 2% palladium on carbon. Filtration of catalyst followed by evaporation of the solvent gave compound X, M.P. 174–179° C.

EXAMPLE 10

*Preparation of 11β,12β-epoxy-pregn-4-en-3,20-dione (XI).*—Compound X, 0.25 gram in 7 ml. of anhydrous toluene, 4 ml. of anhydrous cyclohexanone and 6 ml. of an aluminum isopropoxide solution containing 9.7 grams per 100 ml. were mixed and refluxed 45 minutes. On cooling, treatment with dilute sodium, potassium tartrate followed by steam distillation gave compound XI, M.P. 173.5–175° C.

EXAMPLE 11

*Preparation of 21-acetoxy-11β,12β-epoxy-pregn-4-en-3,20-dione (XII).*—A solution of 0.2 gram of compound XI in a mixture of methanol and tetrahydrofuran was stirred for three hours with 0.4 gram calcium oxide and 0.4 gram of iodine. The crude 21-iodo compound was then refluxed 18 hours with a suspension of potassium acetate in acetone giving compound XII.

EXAMPLE 12

*Preparation of 21 - acetoxy-12α-fluoro-11β-hydroxy-pregn-4-en-3,20-dione (XIII).*—A small sample of compound XII was dissolved in dry chloroform containing anhydrous hydrogen fluoride yielding compound XIII.

We claim:
1. 11α,23-dibromo-12β-hydroxy-diosgenin acetate.
2. 23-bromo-11β,12β-epoxy-diosgenin.
3. 11β,12β-epoxy-diosgenin.
4. 12α-chloro-11β-hydroxy-diosgenin.
5. 12α-chloro-3β,11β,26-triacetoxy-pseudodiosgenin.
6. 11β,12β-epoxy-pseudodiosgenin.
7. 11β,12β-epoxy-pseudodiosgenin diacetate.
8. 11β,12β - epoxy - 3β - hydroxy-pregna - 5,16 - dien-20-one.
9. 3β-acetoxy-11β,12β-epoxy-pregna-5,16-dien-20-one.
10. 11β,12β-epoxy-3β-hydroxy-pregn-5-en-20-one.

(References on following page)

References Cited in the file of this patent

UNITED STATES PATENTS

| | | |
|---|---|---|
| 2,678,932 | Buck et al. | May 18, 1954 |
| 2,782,211 | Wettstein et al. | Feb. 19, 1957 |
| 2,819,264 | Gould et al. | Jan. 7, 1958 |
| 2,838,493 | Garber et al. | June 10, 1958 |
| 2,874,154 | Stork et al. | Feb. 17, 1959 |

OTHER REFERENCES

Herz: "Journal of American Chemical Society," vol. 78, pages 2017–18 (1956) relied on.

Taub et al.: Journal of American Chemical Society, vol. 78 (1956), pages 2912–13 relied on.